UNITED STATES PATENT OFFICE.

MARION E. McMASTER, OF MONROE CITY, MISSOURI.

PROCESS OF TREATING PAINT.

No. 805,984.      Specification of Letters Patent.      Patented Nov. 28, 1905.

Application filed November 16, 1904. Serial No. 232,985.

*To all whom it may concern:*

Be it known that I, MARION E. MCMASTER, a citizen of the United States, residing at Monroe City, county of Monroe, and State of Missouri, have invented a new and useful Process of Treating Paint, of which the following is a specification.

This invention relates to a process of treating paint.

The object of the invention is to render paint more durable, elastic, and insoluble and one that will not chalk, crack, or peel off when once properly applied to any surface, such as wood, brick, iron, stone, or plaster.

With the above and other objects in view, as will appear as the nature of the invention is better understood, the same consists, generally stated, in first rendering milk antiseptic by incorporating therewith mercuric chlorid and then incorporating the antisepticized product with paint.

In carrying the invention into effect sweet milk, either whole or that from which the butter-fat has been separated, is taken, and to it is added in solution an antiseptic agent, preferably mercuric chlorid, and after the antiseptic has been thoroughly incorporated with the milk it is stirred into and thoroughly combined with the paint. In preparing the milk the mercuric chlorid is first dissolved in hot water, and this is added to the milk, the proportion being about from five to eight grains of the antiseptic to one gallon of milk. The antiseptic operates to keep the milk sweet and renders the casein insoluble.

In use the treated milk is added to any good ready-mixed paint in any quantity or proportion that may be desired for the work to be painted and is thoroughly incorporated therewith by stirring. For general housework it has been found that one gallon of the milk to one gallon of paint gives excellent results. To combine the milk with the paint, the former is slightly warmed and is added gradually to the paint, the latter being stirred until all of the milk is thoroughly incorporated with it and after which it can be used as any ordinary paint. If the product be too thick, it may be thinned with linseed-oil. To give the paint a flat surface, a small quantity of paraffin-oil may be added thereto after the milk has been incorporated.

Having thus described the invention, what is claimed is—

1. The herein-described method of treating paint, which consists in incorporating therewith milk to which has been added mercuric chlorid in solution.

2. The herein-described method of treating paint which consists in adding to sweet milk, mercuric chlorid in solution, thoroughly incorporating the antiseptic with the milk, then heating the milk, and stirring it into the paint.

In testimony whereof I have hereunto affixed my signature in the presence of two subscribing witnesses.

MARION E. McMASTER. [L. S.]

Witnesses:
MARK C. HAWKINS,
WILLIAM T. RAGLAND.